United States Patent [19]
Hansen

[11] Patent Number: 5,086,206
[45] Date of Patent: Feb. 4, 1992

[54] SUPPORT ARM

[76] Inventor: Henning Hansen, 1470 Highbush Trail, Pickering, Ontario, Canada, L1V 1N5.

[21] Appl. No.: 684,554

[22] Filed: Apr. 12, 1991

Related U.S. Application Data

[63] Continuation-in-part of Ser. No. 530,357, May 30, 1990, Pat. No. 5,025,126.

[51] Int. Cl.⁵ .............................................. B23K 9/32
[52] U.S. Cl. ................................ 219/125.1; 219/136; 219/137.41; 414/744.5
[58] Field of Search ................ 219/124.31, 125.1, 136, 219/137.41; 414/744.2, 744.4, 744.5

[56] References Cited

U.S. PATENT DOCUMENTS

| | | | |
|---|---|---|---|
| 2,818,494 | 12/1957 | Bernard | 219/125.1 |
| 3,882,300 | 5/1975 | Karlsson | 219/136 |
| 4,390,775 | 6/1983 | Biava et al. | 219/124.34 |
| 4,529,352 | 7/1985 | Suzuki et al. | 414/680 |
| 4,539,465 | 9/1985 | Bosna | 219/137.7 |
| 4,577,089 | 3/1986 | Olson et al. | 219/124.22 |
| 4,629,860 | 12/1986 | Lindbom | 219/125.1 |
| 4,656,329 | 4/1987 | Moerke | 219/136 |
| 4,685,349 | 8/1987 | Wada et al. | 414/744.5 |
| 4,839,490 | 6/1989 | DeSaw | 219/74 |

FOREIGN PATENT DOCUMENTS

| | | | |
|---|---|---|---|
| 1-53776 | 3/1989 | Japan | 219/124.31 |

OTHER PUBLICATIONS

Henning Hansen Inc. brochure "The Hansen Auto Arm", distributed Jan. 1988.

*Primary Examiner*—Clifford C. Shaw
*Attorney, Agent, or Firm*—Ridout & Maybee

[57] ABSTRACT

A support arm for welding operations having outlets at the outer end of the arm providing access to compressed air, fume and dust extraction, and electrical power. All utility conduits such as electric welding power supply conductors, air hoses, extraction ducts and electrical control conduits are encased within the arm to protect them from damage, remove the hazard posed by conduits laying upon the shop floor and to provide for simple access to multiple utilities at a distance from the utility sources. The arm comprises an inner boom pivotally mounted to a stationary supporting structure, an outer jib, and a knuckle pivotally joining the boom and jib. The boom, jib and knuckle are operable in a horizontal plane to provide access to utility connections at the outer end of the jib within an arc defined by the outer extent of the arm. A linkage between the boom, knuckle and jib maintains equal angles between the boom, the axis of the knuckle and the jib to avoid kinking of the flexible conduits connecting from the outer end of the boom, through the knuckle to the inner end of the jib.

21 Claims, 6 Drawing Sheets

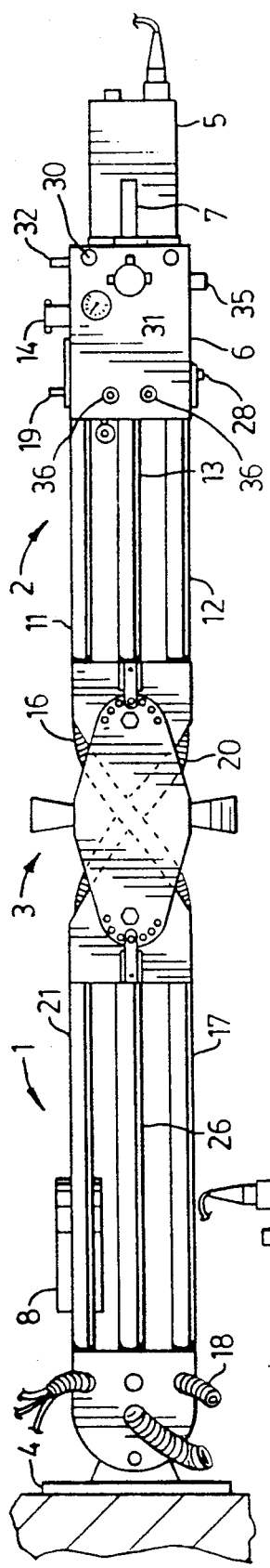
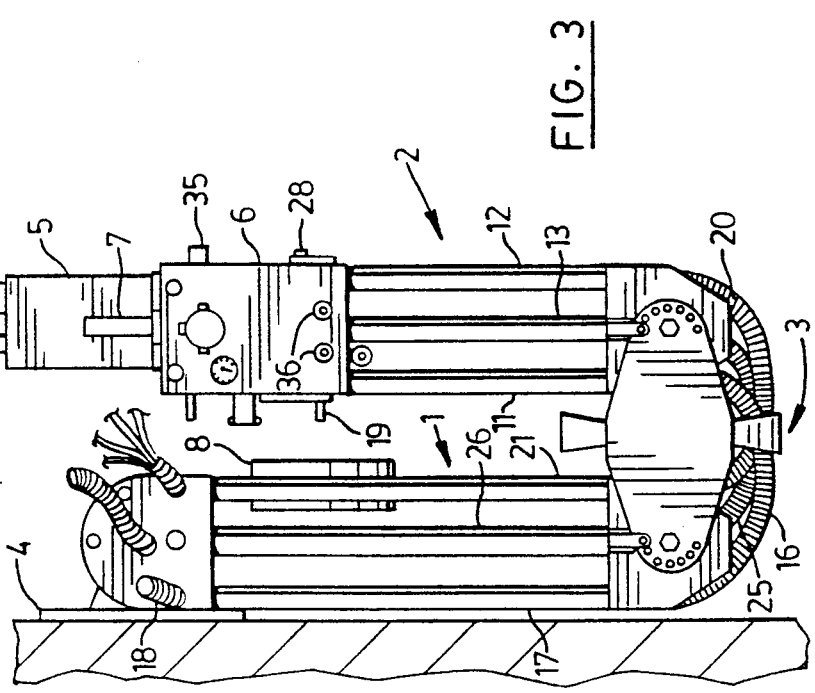
FIG. 2
FIG. 3

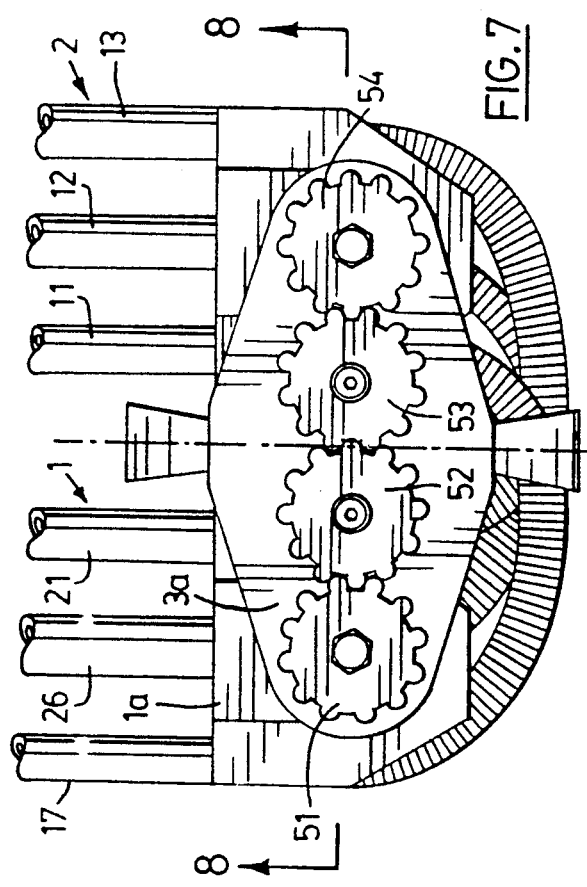
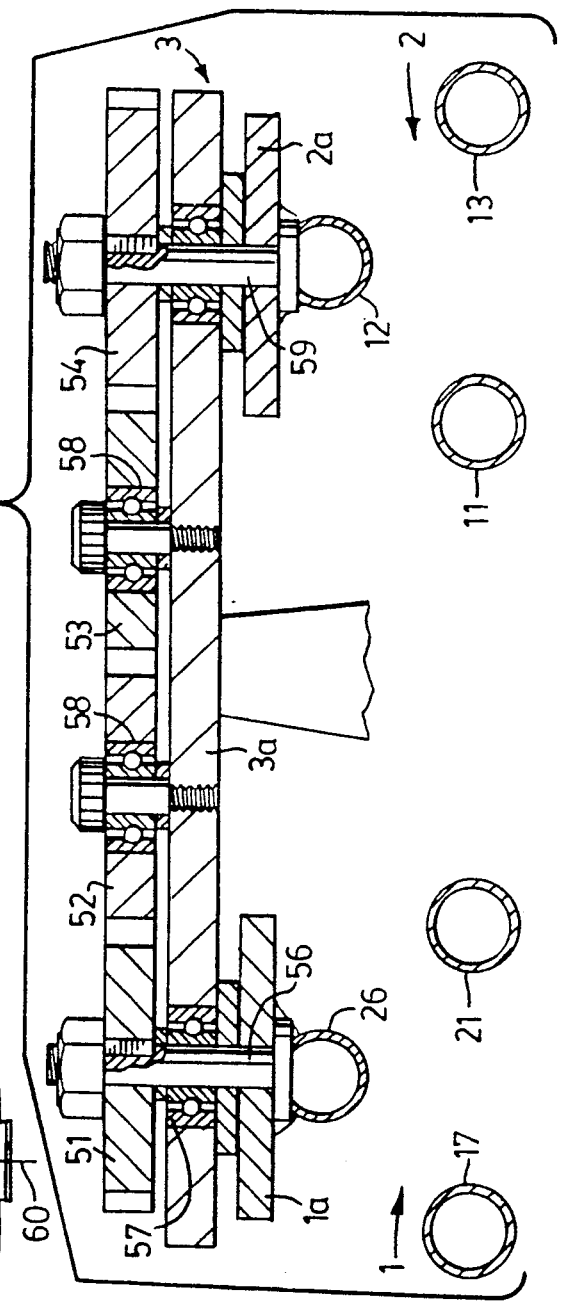

SUPPORT ARM

CROSS-REFERENCE TO RELATED APPLICATION

This application is a continuation-in-part of application Ser. No. 07/530,357 filed May 30, 1990 (U.S. Pat. No. 5,025,126 dated June 18, 1991.

BACKGROUND OF THE INVENTION

1. Field of the Invention

The invention is directed to a pivotally mounted articulated support arm.

2. Description of Related Art

Various operations carried out in workshops and auto body repair shops require provision of welding equipment and various related utilities, such as compressed air, electrical power, fume and dust extraction. It is desirable that access to welding equipment and utilities be provided as close as possible to the work site since exposed conduits, cables and hoses are susceptible to damage and pose a risk to workers. The sources of such utilities are often fixed or adjacent to a workshop wall (for example: electrical power, water and compressed air lines), or the source is difficult to move adjacent to the work site (for example: bottles of compressed gases, and welding power supplies).

In auto body shops for example, M.I.G. (metal arc inert gas) welding equipment is used to join sheet metal members. The welding equipment includes compressed gas cylinders, electric power sources, consumable welding wire spools and wire feeding equipment. In general moving such equipment adjacent to the work site is difficult and cumbersome. Consequently cables, and hoses from the welding equipment extend to the work site across the shop floor posing a risk to workers and subjecting the conduits to damage. Other operations such as grinding, and cutting may require electric and compressed air conduits. Since dust and welding fumes are generated dust and fume vacuum extraction hoses also extend across the shop floor between vacuum equipment and the work site.

All of the above conduits cause considerable cluttering and congestion of the work site. In addition sparks, melted metal globules and falling debris from welding, grinding and cutting of metal may damage the conduits. Winding and unwinding conduits involves significant labour and expose conduits to wear during repetitive operations.

To provide easy access to welding equipment in particular conventional devices provide overhead access through the use of an overhead travelling crane. The crane runs longitudinally on a runway and has a transverse travelling dolly from which is suspended various utility conduits including welding cables and conduits. This device is capable of supporting a relatively heavy load such as welding wire spools, welding wire feeders, and welding guns. Utility conduits such as compressed air lines, welding power supply conductors and welding gas lines may be suspended in a festoon along the crane runway and across the crane bridge between the travelling dolly and the stationary utility source. Such devices are relatively expensive, and require an open overhead space to operate (thus interfering with lifting cranes, for example). As such the devices are generally unsuitable for small shops. The shape of the conduit festoon changes significantly depending upon the position of the crane and dolly, thus altering the resistance to flow within fluid conduits. As a result the head loss due to fluid friction in vacuum conduits varies significantly depending upon the shape of the festoon. Uniformity of vacuum strength is preferred but not possible with such an arrangement. A festoon arrangement is also unsuitable for fume and dust extraction ducts, which are particularly used in welding operations since particles may accumulate in the lower portion of the festoon loops impeding air flow and inducing stress in the duct.

To provide ready access to utilities other than welding equipment, electrical cables and compressed air lines for example have been wound upon a spring loaded spool mounted to the ceiling above a work site in automobile shops, for example. The connecting outlet end of the conduit when not in use is retracted to a height at which it can be reached. When access to the utility conduit is required, the outlet end is connected to an electric or air powered tool and the conduit unwound from the spring loaded spool. Ratchet means maintain the conduit in position relative to the spool until released to rewind upon the spool. Such devices are suitable for relatively small diameter hoses or cables only due to practical size limitations of the spool and the winding diameter of the conduit. Access to the conduit for repairs or inspection is restricted due to the height at which the spool is mounted.

It is desirable, therefore, to provide a device which supports a load, such as welding equipment, and utility conduits, providing ready access to various utility outlets, while accommodating a variety of conduit sizes and types.

It is also desirable that such a device impose as little as possible upon the working area and upon the operation of adjacent shop equipment, such as lifting cranes, for example, and that the device be easily moved and stored in a compact retracted configuration.

SUMMARY OF THE INVENTION

A support arm is provided in accordance with the invention which addresses the disadvantages of the devices described above in a novel manner.

A support arm is provided including an inner boom having a longitudinal axis with mounting means pivotally connected to the inner end of the boom for pivotally mounting the boom to a stationary supporting structure. An outer jib having a longitudinal axis cantilevers from a knuckle having an inner end pivotally connected to the outer end of the boom and having an outer end pivotally connected to the inner end of the jib. Support means are connected to the outer end of the jib for supporting a suspended load. The boom and jib are each constructed of rigid open-ended longitudinal tubes for providing an at least partially encased access channel between the suspended load and the inner end of the boom.

Flexible tube means adjacent the knuckle span between the rigid tubes of the boom and of the jib. In this invention, a drive connects the boom, the knuckle and the jib and provides for the angle between the boom and the median axis of the knuckle to be maintained equal to the angle between the jib and the median axis of the knuckle. The drive performs this function by pivoting each of the boom and the jib relative to the median axis of the knuckle through an angular displacement equal to the angular displacement of the other of the boom and the jib relative to the knuckle's median axis when the said other of the boom and the jib is pivoted relative to the said median axis.

With this arrangement, kinking or pinching of the flexible tubes is avoided, so that flow of service fluids through the tubing is not obstructed.

As will be appreciated by those skilled in the art, various forms of drive may be used to provide equiangularity between the axis of the knuckle and the boom on the one hand and the jib on the other. For example mechanical, pneumatic, hydraulic or electrical drives may be employed. Such drives may comprise a position responsive device connected between each of the knuckle and the boom and the knuckle and the jib, and a motor which may be pneumatically, hydraulically or electrically-activated also connected between each of the knuckle and the boom and the knuckle and the jib. The arrangement is such that on pivoting movement of one of the boom and the jib relative to the knuckle, the position responsive device actuates the motor connected to the other and pivots it through a corresponding angle relative to the knuckle. Various known forms of servo mechanism can be adapted for this purpose. The drive may, for example comprise a pair of opposed hydraulic or pneumatic piston and cylinder devices, the cylinders of which are coupled so that an extension of one piston is matched by a corresponding retraction of the other.

Preferably, however, by reason of its simplicity, low cost, and reliability of operation, the drive is a positive mechanical drive such as a toothed belt, chain or gear drive and preferably comprises a gear train having one gear connected to each of the boom and the jib and an even number of idler gears journalled on the knuckle. Preferably the gear train comprises a train of spur gears having parallel axes.

The above-described support arm is capable of supporting a load at its outer end and accommodates utility conduits within the longitudinal tubes of which the boom and jib are constructed. The arm folds upon itself and may be stored against the supporting structure in a compact configuration.

The arm is particularly suited to welding operations since it may support a welding wire feeder at its outer end. The tubes of the boom and jib may accommodate dust and fume extraction hoses in addition to all M.I.G. welding conduits.

BRIEF DESCRIPTION OF THE DRAWINGS

In order that the invention may be readily understood, a preferred embodiment will be described by way of example with reference to the accompanying drawings.

FIG. 2 is a bottom plan view of the arm in an outstretched configuration.

FIG. 3 is a bottom plan view of the arm in a folded configuration stored adjacent to a supporting wall.

FIG. 7 is a partial plan view showing a gear train drive between the boom, knuckle and jib.

FIG. 8 is a section taken on the line 8—8 in FIG. 7.

DETAILED DESCRIPTION

Figure 1:
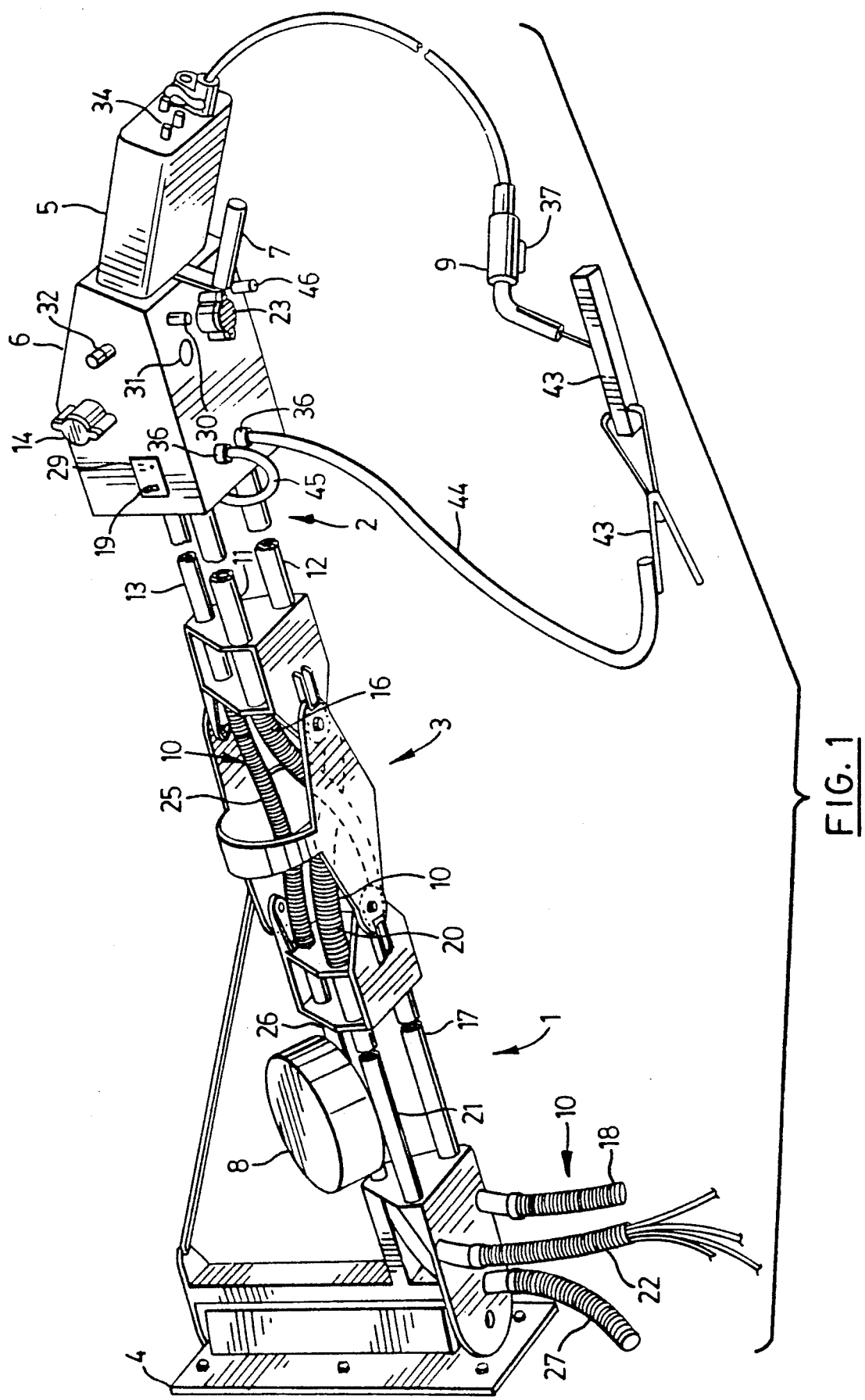
FIG. 1 is an underside oblique view of the arm in an outstretched configuration.

Referring to FIGS. 1, 2 and 3, the general construction and operation of an arm according to the invention may be readily observed. A support arm includes an inner boom 1, an outer jib 2, and a knuckle 3. The boom 1 and jib 2 each have a longitudinal axis and operate in a plane in the embodiment illustrated. A mounting bracket 4 connected to the inner end of the boom 1 pivotally mounts the boom 1 on a hinge to a stationary supporting structure such as a wall or column so that the inner boom 1, outer jib 2 and knuckle 3 operate substantially in a horizontal plane.

The knuckle 3 has an inner end pivotally connected to the outer end of the boom 1, and has an outer end pivotally connected to the inner end of the jib 2. As shown in FIGS. 2 and 3, the pivotal connections between the mounting bracket 4, boom 1, knuckle 3 and jib 2 enable the arm to present the outer end of the jib 2 at a range of distances from the supporting structure and also enable the arm to fold upon itself adjacent a supporting wall for compact storage when not in use. For example when used in association with M.I.G. welding equipment in an auto body shop as illustrated the arm is designed to provide access to utilities in three adjacent repair bays.

A supporting bracket (shown as a truncated triangular transverse plate) is connected to the outer end of the jib 2 for supporting a suspended load. In the embodiment illustrated the load includes a planetary welding wire feeder 5 for M.I.G. welding and a supporting housing 6 accommodating a number of utility outlets, a full description of which will follow A planetary feeder 5 is preferred over conventional feeders due to its relatively light weight and superior feeding characteristics. A handle 7 is also provided to manually guide the arm.

The boom 1 and jib 2 are each constructed of rigid open-ended tubes. The rigid tubes define an at least partially encased access channel between the housing 6 and the inner end of the boom adjacent the supporting structure. A welding power supply conductor passes through the rigid tubes of the boom 1 and jib 2 between the housing 6 and an associated welding power supply source (not shown) positioned adjacent the support structure. For M.I.G. welding, an inert gas line and cooling water lines also pass through the rigid tubes of the boom and jib 2 between their respective sources and the wire feeder 5. A coil 8 of consumable welding wire may be rotatably mounted to the arm. The wire passes through a protective sheath to the housing 6 then through the wire feeder 5 and welding gun 9.

When a welding operation is to be commenced, the worker pulls the arm to the desired location adjacent the work site by grasping the handle 7. The supply conduits, welding wire and wire feeder are all supported by the arm above ground level such that damage to the conduits is avoided and safety hazards associated with conduits laying upon the shop floor are avoided. The worker need not handle conduits or equipment separately, thereby reducing the labour costs and time involved. Conduits are protected from damage and are not subjected to wear from handling which results in a longer service life. The utility supply sources may all be located adjacent the supporting structure eliminating the need to move them and reducing the risk of damage and accidents. When the welding operation is completed, the arm may be folded upon itself as shown in FIG. 3 in a storage position leaving the work site relatively clear. Therefore, the time and effort required to set up and replace the supply conduits and equipment used in a operation is substantially reduced. It will be apparent that the invention is not restricted to use in association with welding operations but any operation requiring access to utilities at a distance from the utility source may be facilitated. For example, if chipping, drilling, grinding, or polishing is to be carried out using compressed air powered or electrically powered tools the housing 6 may be fitted with compressed air outlets and electrical outlets. A hook may be fixed to the housing 6 upon which such tools or the welding gun 9 may be suspended during storage.

In the preferred embodiment shown in the drawings, the boom 1 and jib 2 are constructed of three longitudinal rigid tubes. Each rigid tube is fixed at its inner and outer ends in relation to the other two rigid tubes. The rigid tubes pass through the holes of a truncated triangular end plate and the rigid tubes and end plates are welded together to form a rigid joint. The end plates may include a central hole through which various utility conduits may be threaded if desired. The three rigid tubes of the boom 1 and jib 2 are transversely spaced from each other with their respective axes centred at the vertices of an equilateral triangle. Such a construction results in members of high strength which have open ended tubes to encase utility conduits.

The arm may advantageously include flexible tubes within the area of the knuckle 3. The flexible tubes 10 span between the rigid tubes of the boom 1 and jib 2. The flexible tubes 10 may be used to encase and protect conduits passing between the interiors of the rigid tubes of the boom 1 and jib 2. In order to encase conduits as they pass out of the inner end of the boom 1 adjacent the mounting bracket 4, further flexible tubes 10 may be connected to the inner ends of the rigid tubes of the boom 1.

During welding operations, it is often desirable to extract fumes from the welding site usually using a hose with inlet adjacent the welding arc. It is also desirable to provide dust or flux extraction capability to remove the waste products of welding or to remove particles of contaminants from the weld preparation area. Particularly, when semi automatic flux core welding and coated stick electrodes are used, the resultant solidified slag is chipped from the weld deposit and vacuumed away with a dust extraction hose of a vacuum apparatus.

Figure 4:
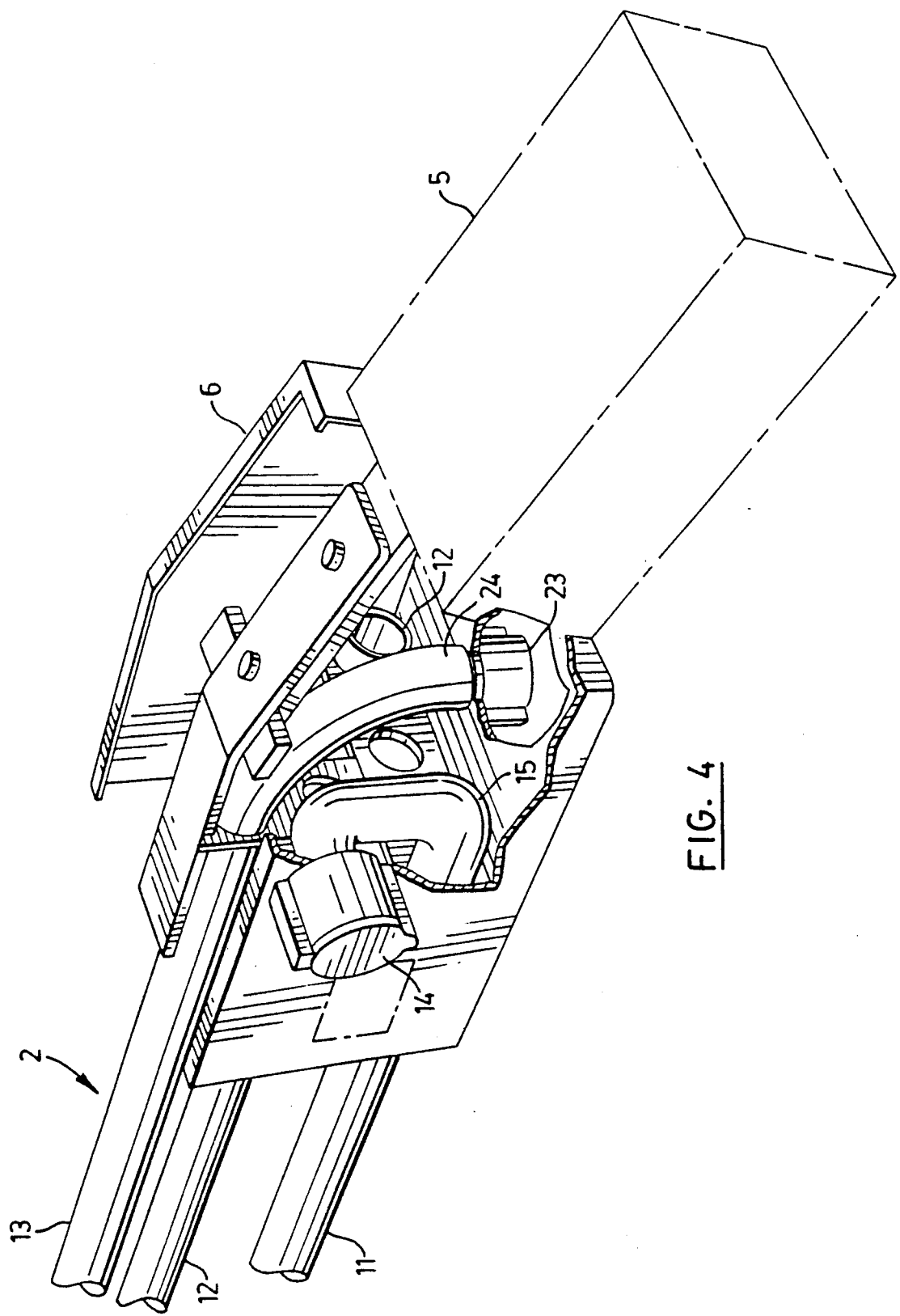
FIG. 4 is a partially broken away detail view of the outer end of the jib showing the fume and dust extraction outlets.

Referring to FIG. 4, the arm may include utility outlets within the housing 6 to enable connection of fume extraction hoses and dust extraction hoses to the outer end of the jib 2. In the embodiment illustrated, a first jib tube operates as a conduit for extracting fumes, a second jib tube 12 provides an encased access channel through which the utility supply conduits may pass, and a third jib tube 13 operates as a conduit for providing vacuum suction to extract particulate matter such as dust, slag and flux.

A fume extraction outlet 14 is located within the housing 6 and provides for the connection of a fume extraction hose (not shown) in a known manner. A rigid fume extraction conduit 15 communicates between the fume extraction outlet 14 and the outer end of the first jib tube 11. As shown in FIG. 1, a first flexible fume extraction conduit 16 communicates between the inner end of the first jib tube 11 and the outer end of a first boom tube 17. In order to avoid kinking of the first flexible fume extractor conduit 16 in the area of the knuckle 3 as the arm is folded, the flexible conduit 16 crosses over the knuckle's longitudinal axis from the first jib tube 11 to communicate with a first boom tube 17 on an opposite side of the longitudinal axis. A second flexible fume extraction conduit 18 communicates between the inner end of the first boom tube 17 and a fume extraction apparatus (not shown) such as a blower and filter assembly. To provide the operator with simple on/off control of the fume extraction apparatus, a fume extraction control switch 19 is mounted within the housing 6. Fume extraction control cables pass from the fume extraction control switch 19 through the second jib tube 12, a first flexible utility conduit 20 (communicating between the inner end of the second jib tube 12 and an associated second boom tube 21), through the second boom tube 21, and through a second flexible utility conduit 22 to the fume extraction apparatus (not shown). It will be apparent that other utility supply conduits, such as compressed air lines, and welding power supply conductors, may also pass through such a route from their respective utility sources to the housing 6.

In a like manner, a vacuum outlet 23 is located within the housing 6 and provides for the connection of a vacuum hose (not shown) in a known manner. Referring to FIG. 4, a rigid vacuum conduit 24 communicates between the vacuum outlet 23 and the outer end of the third jib tube 13. As shown in FIG. 1, a first flexible vacuum conduit 25 communicates between the inner end of the third jib tube 13 and the outer end of a corresponding third boom tube 26. A second flexible vacuum conduit 27 communicates between the inner end of the third boom tube 26 and a vacuum apparatus (not shown) such as a centrifugal cyclone precipitator. A vacuum control switch 28 (shown in FIGS. 2 and 3) is provided within the housing 6 to initiate and halt the operation of the vacuum apparatus. Vacuum control cables pass through the second boom tube 21 and the second jib tube 12 between the vacuum control switch 28 and the vacuum apparatus in a manner analogous to the fume extraction control cables described above.

Referring to FIG. 1, the knuckle 3 preferably has a longitudinal central opening through which the flexible tubes 16, 20 and 25 extend. The central opening is of transverse dimensions sufficient to permit unrestricted lateral arching of the flexible tubes between the rigid tubes of the boom 1 and jib 2 when the longitudinal axis of the knuckle 3 is not colinear with the longitudinal axes of the boom 1 and jib 2 as shown in FIG. 3, for example.

In order to facilitate use of electrically powered tools, electric receptacles 29 are positioned adjacent the vacuum and dust extraction control switches 28 and 19 in the housing 6 with the associated electric power wires passing through the second jib and boom tubes 12 and 21.

Figure 5:
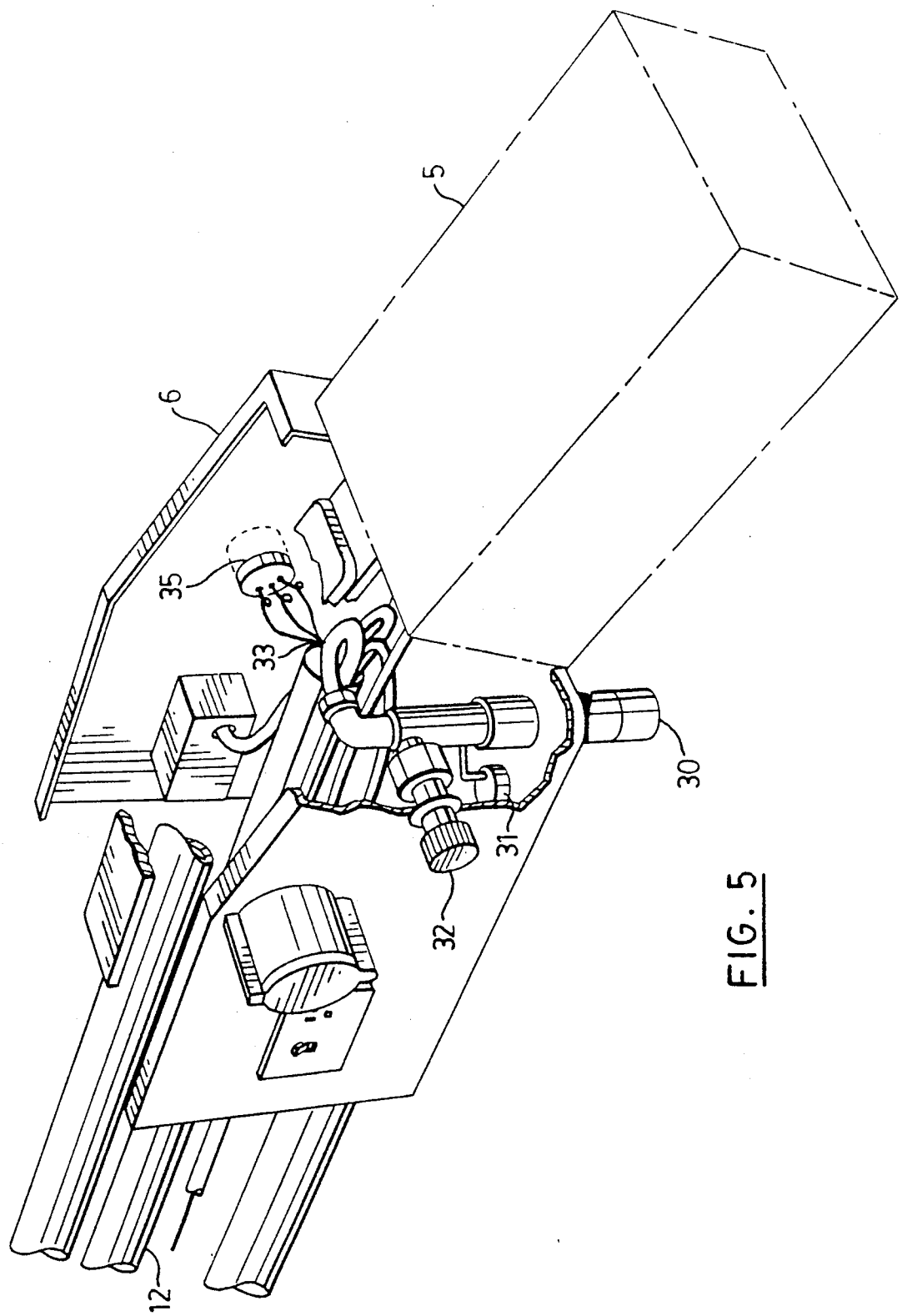
FIG. 5 is a partially broken away detail view of the outer end of the jib showing the compressed air and 110 volt electric power outlets.

In order to facilitate use of compressed air powered tools a non-regulated compressed air outlet 46 is provided. Where regulated air pressure is required such as during plasma-cutting, a regulated compressed air outlet 30, an air pressure gauge 31 and an air regulator 32 are provided within the housing 6. Referring to FIG. 5, a compressed air line 33 passes between the air outlet 30 and a source of compressed air through the second jib tube 12 and associated second boom tube 21 together with other utility supply conduits as described above.

From the foregoing description therefore, it is apparent that an arm in accordance with the invention may provide any number of utility outlets mounted to support means at the outer end of the jib 2 for allowing connection to an associated utility at a distance from an associated utility source. Utility supply conduits engage the interior of the rigid longitudinal tubes of the boom 1 and jib 2 and span between the rigid tubes of the boom 1 and jib 2 adjacent to the knuckle 3. In this way, the utility supply conduits communicate between an associated utility outlet and the associated utility source. The utility supply conduits are protected within the arm. The conduits are raised above the shop floor and simple connection to utilities is enabled.

The preferred embodiment illustrated in the drawings is adapted for use in M.I.G. welding operations but it will be apparent that such an arm may be adapted for other uses in an analogous manner.

When adapted for use in welding operations such as M.I.G., or flux core welding, a welding wire feeder 5 is mounted to the housing 6. The wire feeder 5 as shown in FIG. 1 generally includes wire feed speed and burn back timer controls 34 for controlling the wire feeder 5. Referring to FIG. 5, a heat selection power output dial 35 is mounted to the housing 6 to control the welding process at a distance from the welding power source (not shown). Control cables pass between the power source and output dial 35 through the second rigid tubes 12 and 21 of the jib 2 and boom 1. A welding gun 9 coacts with the wire feeder 5 and welding controls in a known manner. A spool 8 of welding wire is mounted on the arm and the wire passes through the wire feeder 5 and welding gun 9 to the workpiece 43. M.I.G. welding requires supplies of inert gas, electric power to generate a welding arc, cooling water circulation, and arc control cables between the welding gun 9 and the welding power source, gas source and water source. In general, these utilities are supplied via a single welding supply conductor connected to the associated welding supply source and the welding controls. The welding supply conductor passes through the second rigid tubes 12 and 21 of the jib 2 and boom 1 and spans between the rigid tubes of the boom 1 and jib 2 adjacent the knuckle 3. The welding supply conductor includes a electric supply conductor connected to an electric welding power supply. On the underside of the housing 6 are two welding power plugs 36, one connected to a positive electric supply conductor and the other connected to a negative electric supply conductor. Depending upon the type of welding operation, the polarity of the gun 9 and workpiece 43 may be reversed. The power plugs 36, therefore, allow connection of a cable 44 from the workpiece 43 to either plug 36 enabling polarity reversal. The other plug 36 is connected to a conductor 45 which communicates with the welding gun 9. The conductor 45 and cable 44 may therefore be easily unplugged and reversed in plugs 36. The welding supply conductor for M.I.G. welding includes an inert gas supply conduit connected to a gas source and welding gun cooling water circulating conduits connected to refrigerating apparatus. In order to initiate and terminate the welding operation, a welding arc control button 37 is mounted on the welding gun 9. Arc control cables communicate between the welding arc control button 37 and welding arc controls adjacent to and connected with the electric welding power source for controlling the power source. The arc control cables also pass through the associated second jib and boom tubes 12 and 21.

Figure 6:
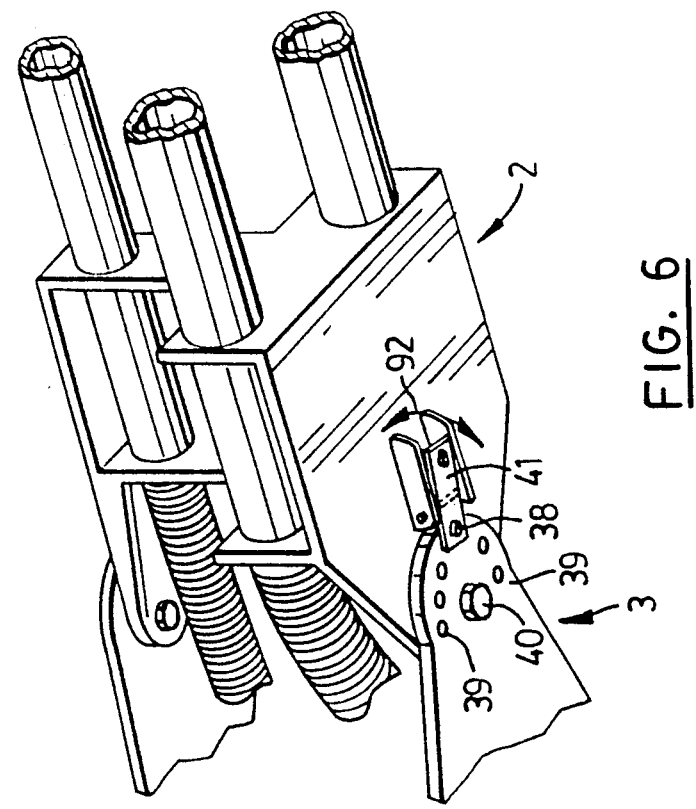
FIG. 6 is a detail oblique view of the area adjacent the pivotal connection between the knuckle and jib from the underside.

In order to lock the arm in a desired configuration or in a fixed position adjacent the work site, the arm may include locking means for releasably locking adjacent pivotally connected members. By locking the members, relative rotational movement between adjacent members is prevented and the arm remains in the desired configuration or position during operations. If the arm is not locked, at least at one connection, there is a risk that the arm may drift laterally and collide with adjacent workers or fixtures. Locking means may be used to lock the following adjacent pivotally connected members: the mounting means 4 and the boom the boom 1 and the knuckle 3; and the knuckle 3 and the jib 2. FIG. 6 illustrates a locking means in the latter case.

The locking means include a spring loaded pin 38 connected to the jib 2 and biased for engagement with a series of mating recesses 39 in the knuckle 3. The recesses 39 are spaced from each other in an arc centred around the axle pin 40 about which the knuckle 3 and jib 2 rotate relative to each other. The pin 38 is released from engagement with the recesses 39 by depressing the rocking lever 41 against the bias of a spring 42 preferably with an associated pneumatic cylinder controlled from a switch (not shown) within the housing 6. The knuckle 3 and jib 2 may therefore be locked in a number of relative rotational positions corresponding to each of the recesses. Locking means may be provided adjacent other pivotal connections in a like manner to lock the members of the arm in position.

The above described locking means may be used to control the rotation of the boom 1 relative to the knuckle 3 and of the jib 2, in order to prevent random pivoting of the boom and the jib relative to the knuckle, which would tend to kink or pinch the flexible tubes 16, 20 and 25 which span between the boom and the jib through the knuckle. For example if, starting from the position shown in FIG. 3, the jib 2 were to be rotated relative to the knuckle 3 through 180° so that it is directed away from the knuckle 3 in the direction opposite to the boom 1, the tubes 10, 16 and 25 would become compressed, pinched and kinked between the adjacent ends of the boom 1 and of the jib 2 which are pivotally connected to the knuckle 3, with the result that gas or other fluid flow would be obstructed and there would be the risk of damaging or permanently deforming the tubes.

In the preferred form a drive as described above is provided between the boom and the knuckle and between the knuckle and the jib to maintain the jib and boom at symmetrical angles relative to the median axis of the knuckle and to avoid the above noted compression, pinching and kinking problems.

Various forms of such drive may be employed as will be apparent to those skilled in the art. FIGS. 7 and 8 show one example wherein a train of spur gears 51, 52, 53 and 54, of which gear 51 is keyed to a shaft 56 journalled in a bearing 57 in an upper plate 3a of the knuckle 3 and fixedly connected, for example by welding, to an upper plate 1a forming part of the boom 1. Idler gears 52 and 53 are journalled on bearings 58 connected to the plate 3a. Gear 54 is keyed to a shaft 59 secured, for example by welding, to an upper plate 2a forming part of the jib 2.

As will be appreciated, with this drive, rotation of one of the elements 1 and 2, for example the jib 2, relative to the median axis 60 of the knuckle 3 results in equiangular rotation of the other element, such as the boom 1. Considering FIG. 7, clockwise rotation of the jib 2 results in clockwise rotation of the gears 54 and 52 and equal anticlockwise rotation of the gears 51 and 53 meshing therewith so that as the jib 2 swings outwardly, the boom 1 swings outwardly relative to the axis 60 of the knuckle by an equal extent. In this manner as the wire feeder 5 is swung out to a desired operating position within the arc of operation of the support arm, the boom 1 and jib 2 are maintained at symmetrical angles relative to the axis of the knuckle 3 and compression, pinching and kinking of the tubes 16, 20 and 25 are avoided.

Figure 9:
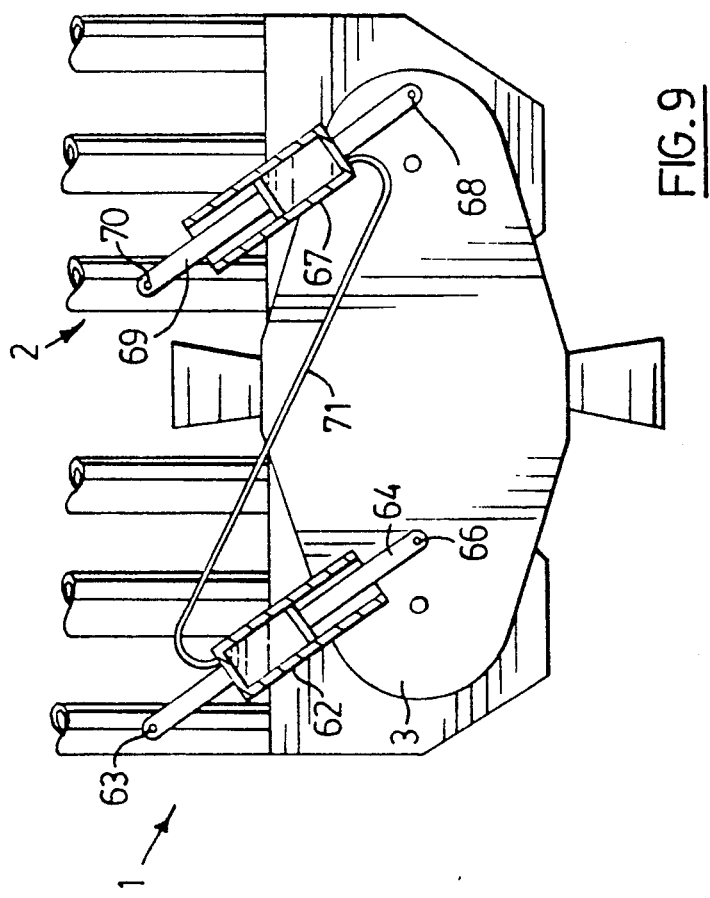
FIG. 9 is a somewhat schematic plan view showing a hydraulic drive connected between the boom, knuckle and jib.

FIG. 9 shows somewhat schematically a further example wherein a cylinder 62 is pivotally connected on the boom 1 at 63 and a piston 64 working in the cylinder 62 is pivoted on the knuckle 3 at 66. An opposed cylinder 67 is pivoted on the knuckle 3 at 68 and its piston 69 is pivoted on the jib 2 at 70. The working fluid, preferably hydraulic liquid, of the cylinders 62 and 67 is placed in flow communication through a conduit 71. As will be appreciated the arrangement illustrated couples the rotational movement of one of the elements 1 and 2 relative to the axis of the knuckle 3 so that equiangularity or symmetry may be maintained.

I claim:

1. A support arm comprising:
   an inner boom having a longitudinal axis;
   mounting means, pivotally connected to the inner end of the boom, for pivotally mounting the boom to a stationary supporting structure;
   an outer jib having a longitudinal axis;
   a knuckle having an inner end pivotally connected to the outer end of the boom and having an outer end pivotally connected to the inner end of the jib said knuckle having a longitudinal median axis;
   support means, connected to the outer end of the jib for supporting a suspended load;
   said boom and said jib each constructed of rigid open-ended tube means for providing an at least partially encased access channel between the suspended load and the inner end of the boom;
   flexible tube means adjacent the knuckle, the flexible tube means spanning between the rigid tube means of the boom and the rigid tube means of the jib; and
   a drive connecting said boom, knuckle and jib and pivoting each one of said boom and jib relative to the median axis of the knuckle through an angular displacement equal to the angular displacement of the other of said boom and jib relative to said median axis when said other is pivoted relative to said median axis.

2. An arm according to claim 1 wherein said drive comprises a gear train having a gear connected to each of said boom and said jib and an even number of at least two idler gears journalled on said knuckle.

3. An arm according to claim 2 wherein said drive comprises a train of spur gears having parallel axes.

4. An arm according to claim 1 wherein said inner boom and said outer jib each comprise at least two horizontally spaced rigid tubes; and said flexible tube means comprise two sets of flexible tubing connecting from adjacent said stationary supporting structure to the inner ends of said horizontally spaced tubes of said inner jib, respectively, and from the outer ends of said tubes of said inner jib and through said knuckle and to the inner ends of said tubes of said outer boom, and wherein the outer ends of said rigid tubes connect to a fume extraction outlet and a vacuum outlet, respectively, provided on said support means, whereby fume extraction services and vacuum services can be provided adjacent said support means from fume extraction apparatus and vacuum apparatus adjacent said stationary supporting structure.

5. An arm according to claim 1 wherein the boom and jib each comprise three rigid tubes, each tube being fixed at its inner and outer ends in relation to the other two tubes.

6. An arm according to claim 5 wherein the three rigid tubes of the boom and jib are transversely spaced from each other with their respective axes centred at the vertices of an equilateral triangle.

7. An arm according to claim 1 comprising locking means for releasably locking at least one pair of adjacent pivotally connected members to prevent relative rotational motion between said adjacent members, said pair of adjacent pivotally connected members selected from the group consisting of: the mounting means and boom; the boom and the knuckle; and the knuckle and the jib.

8. An arm according to claim 7 wherein said locking means comprise a spring loaded pin connected to one member of the pair of adjacent members biased for engagement with a plurality of mating recesses in the other member, the mating recesses spaced from each other in an arc centred about the axis of relative rotation of the adjacent pair of members, and release means engaging the spring loaded pin for withdrawing the pin from engagement with the recesses, whereby the adjacent members may be locked in a plurality of relative rotational positions corresponding to each of the recesses.

9. An arm according to claim 1 wherein said knuckle has a longitudinal central opening through which the flexible tube means extend, the central opening of transverse dimensions sufficient to permit unrestricted lateral arching of the flexible tube means between the rigid tube means of the boom and jib when the longitudinal axis of the knuckle is not colinear with the longitudinal axes of the boom and the jib.

10. An arm according to claim 9 wherein said knuckle comprises:
    an upper plate pivotally connected to an upper portion of the boom and the jib;
    a lower plate pivotally connected to lower portions of the boom and the jib, the axes of rotation of the upper and lower plates being colinear; and
    a transverse hoop between, and rigidly connected to the upper and lower plates.

11. An arm according to claim 1 comprising:
    utility outlet means, mounted to the support means at the outer end of the jib, for allowing connection to at least one utility at a distance from an associated utility source; and
    utility supply conduit means, engaging the interior of the rigid longitudinal tube means of the boom and jib, and spanning between the rigid tube means of the boom and jib adjacent the knuckle, for communicating between an associated utility outlet means and the associated utility source.

12. An arm according to claim 11 comprising:
    a welding wire feeder connected to the support means;

first welding control means, connected to the support means, for controlling a welding process and for controlling the wire feeder;

a welding gun coacting with the wire feeder and first welding control means;

a spool of welding wire rotatably mounted to the arm and passing through the wire feeder and welding gun; and a welding supply conductor connected the first welding control means and associated welding supply source, the welding supply conductor passing through the rigid tube means of the boom and jib and spanning between the rigid tube means of the boom and jib adjacent the knuckle;

whereby welding and control of the welding process may be carried out at a distance from the power supply and whereby the welding supply conductors are partially encased and supported at an elevation within the rigid tube means.

13. An arm according to claim 12 wherein the welding supply conductor comprises electric power supply conductor connected to an electric welding power source.

14. An arm according to claim 13 further comprising:

second welding control means adjacent to and connected with the electric power source for controlling the electric power source;

welding arc control means connected to the welding gun for initiating and terminating the welding arc; and arc control cables, communicating between the second welding control means and the welding arc control means, and passing through associated boom and jib rigid tube means.

15. An arm according to claim 12 wherein the welding supply conductor comprise gas supply conduits connected to a gas source whereby the gas metal arc welding process is facilitated.

16. An arm according to claim 12 wherein the welding supply conductor comprises welding gun cooling water circulating conduits connected to a refrigerating apparatus.

17. An arm according to claim 11 wherein the utility outlet means comprises a compressed air outlet.

18. An arm according to claim 11 wherein the utility outlet means comprises an electric receptacle.

19. An arm according to claim 11 wherein the boom and jib each comprise three associated longitudinal rigid tubes.

20. An arm according to claim 19 including a fume extraction conduit communicating between: a fume extraction outlet and the outer end of first jib tube; the inner end of the first jib tube and the outer end of a first boom tube; and, the inner end of the first boom tube and fume extraction means, and further including fume extraction control cables passing through associated second boom and second jib tubes, and connected to a fume extraction control switch mounted to the support means.

21. An arm according to claim 19 including a vacuum conduit communicating between: a vacuum outlet and the outer end of a third jib tube; the inner end of the third jib tube and the outer end of a third boom tube; and the inner end of the third boom tube and vacuum means, and further including vacuum control cables passing through associated second boom and second jib tubes and connected to a vacuum control switch mounted to the support means.

* * * * *